UNITED STATES PATENT OFFICE.

JAMES H. BELL AND JOHN H. CONRAD, OF CHICAGO, ILLINOIS.

IMPROVEMENT IN COMPOSITIONS FOR GLAZING ROASTED COFFEE.

Specification forming part of Letters Patent No. 167,383, dated September 7, 1875; application filed July 27, 1875.

*To all whom it may concern:*

Be it known that we, JAMES HAMILTON BELL and JOHN HENRY CONRAD, both of the city of Chicago, county of Cook and State of Illinois, have jointly invented a new and Improved Compound for Glazing Roasted Coffee, which compound and the manner of its use are fully set forth in the following specification.

The nature of our invention relates to a means of rendering coffee impervious to air, controlling the shrinkage at the time of roasting, and preventing deterioration consequent upon the dispersion of aroma or a wasteful development of the empyreumatic flavor.

We are well aware that coffee and other vegetable products were many years ago coated with mucilaginous, saccharine, or other substance, for the purpose of preventing the diffusion of essence; and, therefore, we make no pretence to be the first to glaze coffee; but we do claim to have made a new and useful composition of innoxious matter, which, when applied to roasted or roasting coffee, preserves its flavor and serves to clarify it in its use.

For the purpose of enabling others to make and use our compound, we will proceed to specify its ingredients and manner of use.

We mix and blend well the following-mentioned articles in proportion, about as follows: To each gallon of pure water we add of molasses, four ounces; of turmeric, one-eighth ounce; of wheat flour—although other flour may be used, such as rice—eight ounces; of alcohol, one ounce; of gum-arabic, one ounce. The mixture is then subjected to a boiling process, and, when well cooked, strained through a fine sieve; then while the coffee is roasting, or afterward, we pour the mixture upon it and stir the concrete mass until all the berries of the coffee are completely covered and protected from contact with air; we then pack in any convenient form.

We claim—

A composition for glazing roasted coffee, composed of pure water, molasses, turmeric, flour, alcohol, and gum-arabic, substantially as hereinbefore set forth.

JAMES HAMILTON BELL.
JOHN HENRY CONRAD.

Witnesses:
 W. T. M. WHINNEY,
 W. S. PORTER.